Patented May 13, 1941

2,241,951

UNITED STATES PATENT OFFICE 2,241,951

LUMINESCENT MATERIAL

Magdalene Hüniger, Berlin-Charlottenburg, and Hans Panke, Berlin, Germany, assignors to General Electric Company, a corporation of New York No Drawing. Application December 20, 1939, Serial No. 310,255. In Germany March 2, 1938

2 Claims. (Cl. 250—81)

Our invention relates in general to luminescent materials or phosphors such as are used in gaseous electric discharge devices for the production of fluorescent light. The present application is a continuation-in-part of our copending application Serial No. 258,858, filed February 27, 1939, and assigned to the assignee of the present application.

According to the above-referred-to co-pending application, luminescent materials and methods of manufacture are disclosed in which one or several borates and/or phosphates of the alkali metals, the metals of the second group of the periodic system excepting mercury, and the metals of the third main group of the periodic system (boron not counting as a metal), are activated by the addition of 0.05 to 30 mol per cent of one or several borates and/or phosphates of silver, thallium, tin or lead followed by a subsequent heating.

One object of the present invention is to provide luminescent substances of the above type which will produce particularly good red to yellow luminescence when excited by short-wave radiations.

Another object of our invention is to provide a method for producing such red to yellow luminescing substances.

Further objects and advantages of our invention will appear from the following description of species thereof.

According to the invention, one or more borates and/or phosphates of the alkali metals, the metals of the second group of the periodic system excepting mercury, and the metals of the third main group of the periodic system are activated by an addition of 0.05 to 30 mol per cent of one or more borates and/or phosphates of cerium or antimony together with an addition of 0.05 to 40 mol per cent of manganese borate and/or phosphate. In this manner, luminescent materials are obtained with an extraordinarily powerful red or yellow luminosity. By increasing the cerium content the luminosity can be displaced toward the yellow, while by increasing the manganese content the luminosity can be displaced toward the red.

The luminescent substances or phosphors are produced by heating a mixture of the original materials which may be finely powdered or which may consist of coarse granules. For the original materials, one can use oxides, carbonates, oxalates, and similar salts, which are transformed into borates or phosphates by the addition of boric acid, phosphoric acid, ammonium phosphate or the like. One can also start with the finished borates and phosphates and may transform them into phosphors by mixing and heating. It is not necessary to fuse them together; a simple sintering will suffice. In many instances, however, it is advisable to melt the materials. After the melting, they can be left to solidify into glassy or crystalline bodies. If the phosphors are to solidify in a glassy form, it is advisable to increase the addition of boric or phosphoric acid to such an extent that the oxide or acid content will exceed the acid content called for by the chemical formula of the metaborates or metaphosphates.

The luminous materials or phosphors according to the invention can be utilized in many different ways. In particular, they can be applied in a cohesive layer to the inside or outside wall of the envelopes of gaseous discharge lamps, or on glass covers or shields for such lamps. For this purpose, the luminous material can be mixed with an application medium such as water or alcohol, and the resulting solution brushed onto the envelope wall. However, it is also possible to first coat the base or envelope wall with a binder such as water glass, glycerin, boric acid and particularly phosphoric acid, on which the luminous material is then applied in a cohesive layer. The luminous materials, during their application, can be heated without difficulty up to the softening temperature of the glass.

What we claim as new and desire to secure by Letters Patent of the United States is:

1. A luminous substance comprising a heat treated combination of one or more of the materials belonging to the group of compounds consisting of the borates and phosphates of the alkali metals, the metals of the second group of the periodic system excepting mercury, and the metals of the third main group of the periodic system, activated by one or more activating materials belonging to the group of compounds consisting of the borates and phosphates of cerium and antimony, and an activating material belonging to the group of compounds consisting of the borate and phosphate of manganese.

2. A luminous substance comprising a heat treated combination of one or more of the materials belonging to the group of compounds consisting of the borates and phosphates of the alkali metals, the metals of the second group of the periodic system excepting mercury, and the metals of the third main group of the periodic system, activated by 0.05 to 30 mol per cent of one or more activating materials belonging to the group of compounds consisting of the borates and phosphates of cerium and antimony, and 0.05 to 40 mol per cent of an activating material belonging to the group of compounds consisting of the borate and phosphate of manganese.

MAGDALENE HÜNIGER.
HANS PANKE.